(12) United States Patent
Wang et al.

(10) Patent No.: US 9,092,673 B2
(45) Date of Patent: Jul. 28, 2015

(54) COMPUTING VISUAL AND TEXTUAL SUMMARIES FOR TAGGED IMAGE COLLECTIONS

(75) Inventors: Jingdong Wang, Beijing (CN); Xian-Sheng Hua, Beijing (CN); Shipeng Li, Palo Alto, CA (US); Hao Xu, Hefei (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 922 days.

(21) Appl. No.: 12/436,783

(22) Filed: May 7, 2009

(65) Prior Publication Data

US 2010/0284625 A1    Nov. 11, 2010

(51) Int. Cl.
  *G06K 9/62*       (2006.01)
  *G06K 9/00*       (2006.01)
  *G06F 17/30*      (2006.01)

(52) U.S. Cl.
  CPC ...... *G06K 9/00664* (2013.01); *G06F 17/30265* (2013.01); *G06F 17/30719* (2013.01); *G06K 9/6255* (2013.01)

(58) Field of Classification Search
  None
  See application file for complete search history.

(56) References Cited

U.S. PATENT DOCUMENTS

| 7,184,959 | B2 | 2/2007 | Gibbon et al. | |
| 7,917,755 | B1* | 3/2011 | Giliyaru et al. | 713/169 |
| 2002/0065844 | A1* | 5/2002 | Robinson et al. | 707/500 |
| 2007/0156669 | A1 | 7/2007 | Marchisio et al. | |
| 2007/0271297 | A1 | 11/2007 | Jaffe et al. | |
| 2008/0089561 | A1* | 4/2008 | Zhang | 382/118 |
| 2008/0092054 | A1 | 4/2008 | Bhumkar et al. | |
| 2008/0133488 | A1 | 6/2008 | Bandaru et al. | |
| 2008/0154886 | A1* | 6/2008 | Podowski et al. | 707/5 |
| 2008/0215561 | A1 | 9/2008 | Yu et al. | |
| 2008/0253656 | A1* | 10/2008 | Schwartzberg et al. | 382/181 |
| 2008/0298766 | A1* | 12/2008 | Wen et al. | 386/46 |
| 2010/0205202 | A1* | 8/2010 | Yang et al. | 707/767 |
| 2010/0223299 | A1* | 9/2010 | Yun, II | 707/803 |

OTHER PUBLICATIONS

Li, et al., "Modeling and Recognition of Landmark Image Collections Using Iconic Scene Graphs", Retrieved at<<http://www.cs.unc.edu/~lazebnik/publications/eccv08.pdf>>, pp. 1-14.

Liao, et al. "LiveImage: Organizing Web Images by Relevant Concept", Retrieved at<<http://wkd.iis.sinica.edu.tw/~deanliao/doc/wsa.pdf>>, pp. 210-220.

Datta, et al. "Studying Aesthetics in Photographic Images Using a Computational Approach", Retrieved at<<http://infolab.stanford.edu/~wangz/project/imsearch/Aesthetics/ECCV06/datta.pdf>>, pp. 14.

(Continued)

*Primary Examiner* — Sumati Lefkowitz
*Assistant Examiner* — Jhere Rowland
(74) *Attorney, Agent, or Firm* — Steve Wight; Judy Yee; Micky Minhas

(57) ABSTRACT

Described is a technology for computing visual and textual summaries for tagged image collections. Heterogeneous affinity propagation is used to together identify both visual and textual exemplars. The heterogeneous affinity propagation finds the exemplars for relational heterogeneous data (e.g., images and words) by considering the relationships (e.g., similarities) within pairs of images, pairs of words, and relationships of words to images (affinity) in an integrated manner.

20 Claims, 8 Drawing Sheets

(56) References Cited

OTHER PUBLICATIONS

Blei, et al. "Modeling Annotated Data", Retrieved at<<http://www.cs.princeton.edu/~blei/papers/BleiJordan2003.pdf>>, SIGIR'03, Jul. 28-Aug. 1, 2003, Toronto, Canada, pp. 8.

Barnard, et al. "Learning the Semantics of Words and Pictures", Retrieved at<<http://www.wisdom.weizmann.ac.il/~vision/courses/2003_2/barnard00learning.pdf>>, pp. 8.

"Picasa Web Albums", Retrieved at<<http://picasaweb.google.com/>>, p. 1.

"CPAN", Retrieved at<<http://search.cpan.org/dist/>>, p. 1.

"WordNet", Retrieved at<<http://wordnet.princeton.edu/>>, 2006, pp. 2.

"Flickr", Retrieved at<<http://www.flickr.com/groups/>>, pp. 2.

Clough, et al. "Automatically Organizing Images using Concept Hierarchies", Retrieved at<<http://www.dcs.gla.ac.uk/~hideo/pub/sigir05/mmir05.pdf>>, pp. 7.

Dhillon Inderjit S. "Co-Clustering Documents and Words using Bipartite Spectral Graph Partitioning", Retrieved at<<http://delivery.acm.org/10.1145/510000/502550/p269-dhillon.pdf?key1=502550&key2=9628160321&coll=GUIDE&dl=GUIDE&CFID=16610564&CFTOKEN=24160575>>, KDD 01 Sanfrancisco CA USA, ACM 2001, pp. 269-274.

Dhillon, et al. "Information-Theoretic Co-Clustering", Retrieved at<<http://www.cs.utexas.edu/users/inderjit/public_papers/kdd_cocluster.pdf>>, SIGKDD '03, Aug. 24-27, 2003, Washington, DC, USA, 2003 ACM, pp. 10.

Frey, et al. "Clustering by Passing Messages between Data Points", Retrieved at<<http://www.psi.toronto.edu/affinitypropagation/FreyDueckScience07.pdf>>, vol. 315, Feb. 15, 2007, pp. 23.

Gao, et al. "Web Image Clustering by Consistent Utilization of Visual Features and Surrounding Texts", Retrieved at<<http://delivery.acm.org/10.1145/1110000/1101167/p112-gao.pdf?key1=1101167&key2=2248160321&coll=GUIDE&dl=GUIDE&CFID=16610745&CFTOKEN=50715619>>, MM'05, Nov. 6-11, 2005, Singapore, ACM 2005, pp. 112-121.

Jaffe, et al. "Generating Summaries for Large Collections of Geo-Referenced Photographs", Retrieved at<<http://delivery.acm.org/10.1145/1140000/1135911/p853-jaffe.pdf?key1=1135911&key2=4358160321&coll=GUIDE&dl=GUIDE&CFID=16610854&CFTOKEN=38950020>>, WWW 2006, May 23-26, 2006, Edinburgh, Scotland, ACM, pp. 853-854.

Frey, et al. "Factor Graphs and the Sum-Product Algorithm", Retrieved at<<http://www.psi.toronto.edu/pubs/2001/frey2001factor.pdf>>, IEEE Transactions on Information Theory, vol. 47, No. 2, Feb. 2001, pp. 498-519.

Raguram, et al. "Computing Iconic Summaries for General Visual Concepts", Retrieved at<<http://cs.unc.edu/~lazebnik/publications/iconic.pdf>>, pp. 1-8.

Rege, et al. "Graph Theoretical Framework for Simultaneously Integrating Visual and Textual Features for Efficient Web Image Clustering", Retrieved at<<http://delivery.acm.org/10.1145/1370000/1367541/p317-rege.pdf?key1=1367541&key2=8968160321&coll=GUIDE&dl=GUIDE&CFID=16086296&CFTOKEN=55911022>>, WWW 2008 / Refereed Track: Rich Media, Apr. 21-25, 2008. Beijing, China, ACM, pp. 317-326.

Rother, et al. "Digital Tapestry", Retrieved at<<http://www.cs.cmu.edu/~skumar/paper_DigitalTapestry_CVPRO5.pdf>>, pp. 8.

Schmitz Patrick, "Inducing Ontology from Flickr Tags", Retrieved at<<http://www.semanticmetadata.net/hosted/taggingws-www2006-files/22.pdf>>, WWW 2006, May 22-26, 2006, Edinburgh, UK, pp. 4.

Simon, et al. "Scene Summarization for Online Image Collections", Retrieved at<<http://ieeexplorejeee.org/stamp/stamp.jsp?arnumber=4408863&isnumber=4408819>>, 2007 IEEE, pp. 8.

Wang, et al. "Picture Collage", Retrieved at<<http://ieeexplore.ieee.org/stamp/stamp.jsp?arnumber=1640779&isnumber=34373>>, Proceedings of the 2006 IEEE Computer Society Conference on Computer Vision and Pattern Recognition (CVPR'06), pp. 8.

\* cited by examiner

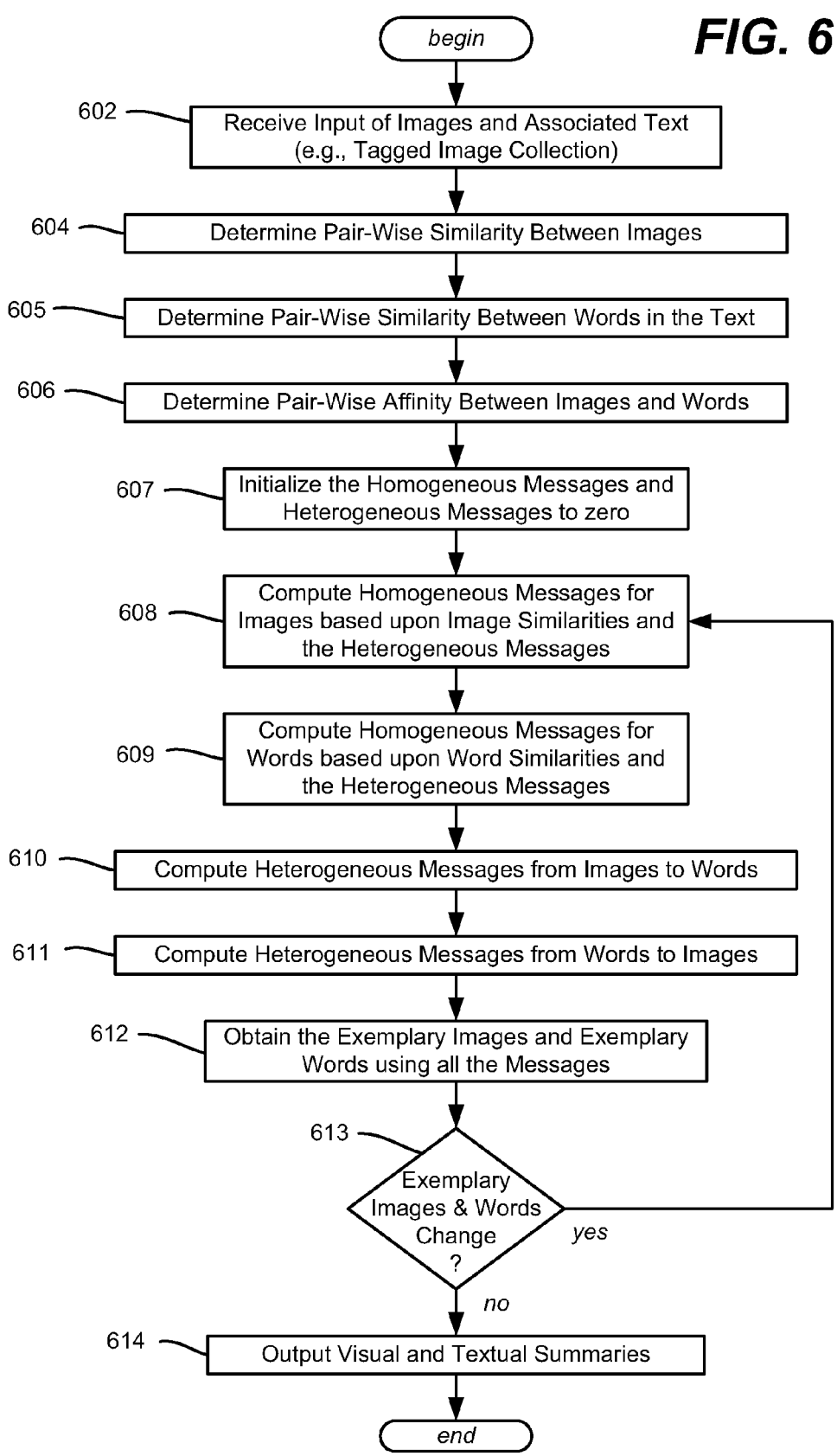

COMPUTING VISUAL AND TEXTUAL SUMMARIES FOR TAGGED IMAGE COLLECTIONS

BACKGROUND

Image search engines, photograph-sharing websites and desktop photograph management tools have made it easy for computer users to access and collect large numbers of images. However, image collections are usually unorganized, which makes finding desired photographs or obtaining a quick overview of an image collection very difficult. Thumbnails, tapestries, collages and feature-based processing have been attempted to help users find desired images within a collection.

Many image collections are accompanied by rich text information, and such image collections are referred to herein as tagged image collections. For example, images may be titled, tagged, and/or annotated by users. Images from web pages are often associated with accompanying text, which may be used for image indices in most existing image search engines. The text information usually reflects the semantic content of images, whereby users may obtain a semantic overview of a collection, but often contains significant "noise" that leads to undesirable results.

Any improvements in technology with respect to visual-based and textual-based techniques that help users deal with large images collections are thus desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which input, comprising images with associated text labels (e.g., a tagged image collection), is processed into a visual summary and a textual summary. The processing is based upon finding relationships within the images, finding relationships within the words that are in the text labels, and finding relationships between images and words. These relationships are used to produce the visual and textual summaries.

In one aspect, the relationships within the images comprise image similarity values between pairs of images. Similarly, the relationships within the words are word similarity values between pairs of words. The similarity values between images are used to compute the homogeneous messages to be propagated within images. The similarity values between words are used in the same way. Heterogeneous messages are computed based on the relationships (affinities) between images and words. A heterogeneous affinity propagation scheme is used to propagate the homogeneous messages within images and words and propagate heterogeneous messages across images and words. The visual and textual summaries are based upon the aggregation of the messages each image and word receives.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 6 is a flow diagram showing a general process to determine visual and textual summaries for a tagged image collection.

DETAILED DESCRIPTION

Various aspects of the technology described herein are generally directed towards computing visual and textual summaries for a tagged image collection that help characterize the content of the tagged image collection. In general, instead of computing such visual and textual summaries separately, visual and textual summaries are computed together. To this end, there is described a scalar message propagation scheme over images and words, referred to as heterogeneous affinity propagation, to simultaneously find visual and textual exemplars. As will be understood, this is beneficial in that the technology integrates visual exemplar finding and textual exemplar finding, whereby each benefits from the other by taking advantage of homogeneous relationships with images and texts as well as heterogeneous relationships between them, as well as by operating together (instead of performing a post-process to find centers followed by a clustering procedure, for example).

While some of the examples herein are directed towards visually and textually summarizing live image search results, such as to deliver both visual and textual summaries for live image search results using both visual content and surrounding text, it should be understood that any of the examples described herein are non-limiting examples. Any tagged image collection may be processed, regardless of how the images are obtained and/or stored. Further, any description of how the visual and textual summaries are used in an application or the like is non-limiting, e.g., the summaries may be used to suggest images of interest for a user to find, to form a visual and textual cover for a group to help consumers decide if it is necessary to create a new group, to provide a quick visual and textual overview for image search results, and so forth.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and image and text processing in general.

Figure 1:
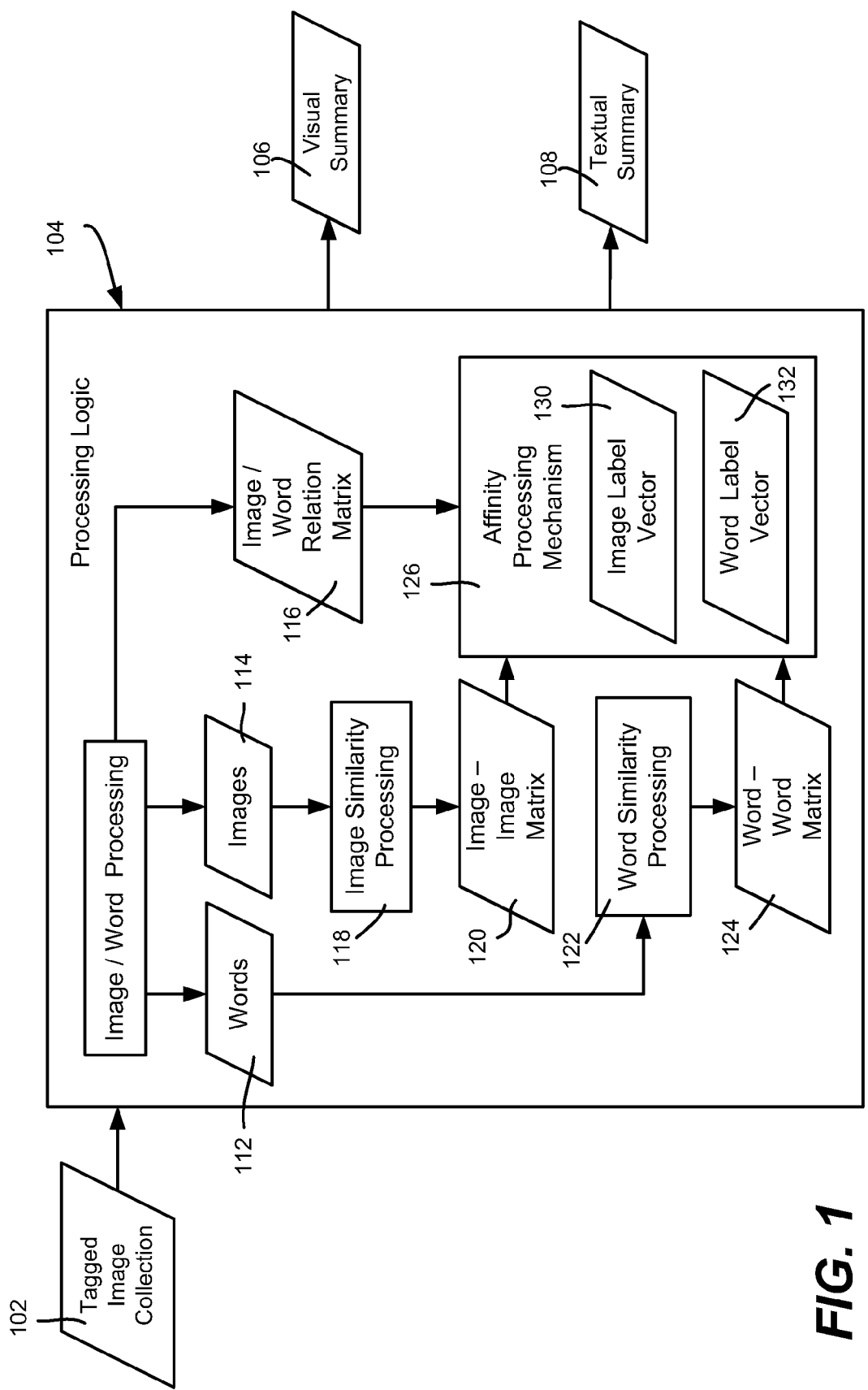
FIG. 1 is a block diagram showing example components for determining visual and textual summaries for a tagged image collection, including by using word and image relationships.

Turning to FIG. 1, there is shown a tagged image collection 102 being provided as input to processing logic 104, which outputs a visual summary 106 and/or a textual summary 108 as described herein. Note that any type of images with associated text labels may serve as suitable input; a tagged image collection is a typical example of such input. Further, note that the visual summary 106 and textual summary 108 each generally comprise one or more exemplars, e.g., a set of one or more representative images and a set of one or more words that represent the input 102; however any type of summaries are feasible, e.g., a composite image rather than an actual image may be used (at least for one image), a sentence rather than a group of independent words may be used, an audio representation of the text may be provided via text-to-speech, and so forth.

In general, the image processing logic 104 includes an image/word processing mechanism 110 that maintains relationships between the words 112 (taken from the text) and the images 114, including via an image/word relation matrix 116 as described below. An image similarity processing mechanism 118 determines similarities between pairs of images, e.g., based upon each image's features, such as distances between feature vectors representing the images. These data may be maintained as an image-to-image matrix 120. In one implementation, the image similarity may be determined from various low level features (e.g., color moment, SIFT) that are extracted to represent each image, with similarity evaluated as a negative Euclidean distance over the low level features, and normalized to have mean −1 and variance 1.

Similarly, a word similarity processing mechanism 122 determines similarities between pairs of words. These data may be maintained as a word-to-word matrix 124. In one implementation, for finding word similarity, the known WordNet® similarity concepts may be used, which in general comprise a variety of semantic similarity and relatedness measures based on a large lexical database of an appropriate language (e.g., English), also normalized to have with mean −1 and variance 1.

As described below, the various data (e.g., matrices) are processed by a heterogeneous and homogenous affinity propagation mechanism (algorithm) 126. In general, the image-to-word relationships are heterogeneous relationships, while the image-to-image and word-to-word relationships are homogeneous relationships.

In general, the task of computing both visual and textual summaries is formulated as finding a compact set of image and word exemplars from an image collection and the associated text labels. For such a task in a tagged image collection of images and text labels, there are the three aforementioned relationships: two homogeneous relationships within images and texts, including image similarity and text similarity data, and one heterogeneous relationship between images and text labels, e.g., their association relationships. Described herein is finding both visual and textual exemplars together, including by processing the three relationships together to visually and textually summarize a tagged image collection.

Given a set of n images, $I=\{I_1, I_2, \ldots, I_n\}$, a set of corresponding texts, $T=\{T_1, T_2, \ldots, T_n\}$, and the set of words within the text $T_k=W_1^k, W_2^k \ldots W_{m_k}^k$, the processing logic 104 finds the visual summary 106, a set of image exemplars, $\bar{I} \in I$, as well as the textual summary 108 and a set of word exemplars, $\bar{W} \in W$, where $W=T_1 \cup T_2 \cup T_n$ is the union set of words. Note that a "word" is not limited to delineation by a space or the like, e.g., a phrase such as "blue sky" may be considered a word.

Consider that the set of words W comprises m words, i.e., $W=\{W_1, \ldots, W_m\}$; then the association relationships between the n images and the corresponding texts can be represented by the relation matrix 116 having dimension n×m, $R=[r_{ij}]$, where $r_{ij}=1$ if $W_j \in T_i$, and 0 otherwise. This relation is between heterogeneous data, namely images and words.

The homogeneous relationships for images, in the image-to-image relation matrix 120, is of dimension n×n, $S^I=[s^I(l, k)]$, and represents the pair-wise similarities within images. The homogeneous relationships for words, in the word-to-word relation matrix 124 is of dimension m×m, $S^W=[s^W(l, k)]$, and represents the pair-wise similarities within words.

Figure 2:
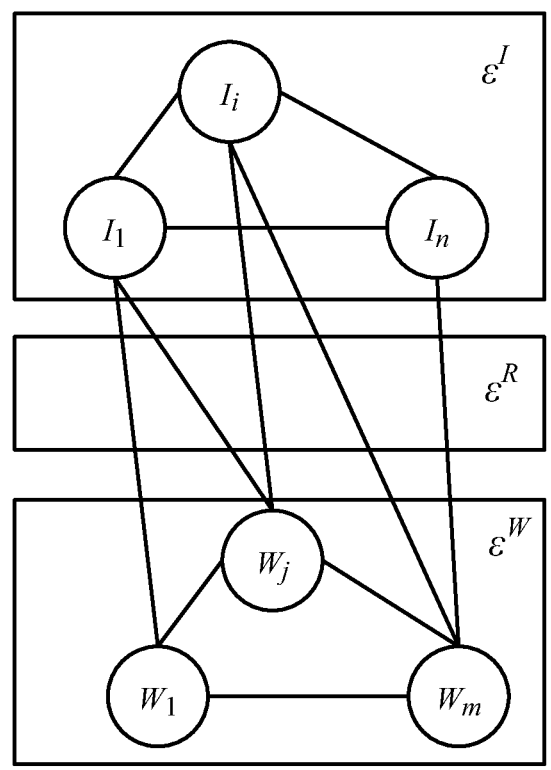
FIG. 2 is a representation comprising a graph showing relationships between images, between words, and between images and heterogeneous relationships between images and words.

These three relations (one heterogeneous, two homogeneous) are depicted in FIG. 2. The heterogeneous relations are represented by the edges between images (I) and words (W), (in the block labeled $\epsilon^R$), the homogeneous relations within images are represented by the edges within images, (in the block labeled $\epsilon^I$), and the homogeneous relations within words are represented by the edges within words, (in the block labeled $\epsilon^W$).

A set of image exemplars $\bar{I}$ can be denoted as $\bar{I}=\{I_{c1}, I_{c2}, \ldots I_{cn}\}$ where $c_k \in \{1, 2, \ldots, n\}$ is the exemplar image index of image $I_k$, and $c=[c_1 \ c_2 \ldots c_n]^T$ is referred to as a label vector 130 (FIG. 1) over images. If such a label vector satisfies a valid constraint that an image also serves as the exemplar of itself if it is an exemplar of any other image, it corresponds to a set of image exemplars. In other words, identifying the exemplars can be viewed as searching over valid configurations of the labels c. Similarly, a label vector b (132 in FIG. 1) is defined as, $b=[b_1 \ b_2 \ldots b_m]^T$ for words to represent the word exemplars. Thus, the processing logic 104 performs the task of identifying visual and textual exemplars (from candidate exemplars) by finding valid label vectors c and b, such that the following two properties are satisfied: 1) these image and word exemplars are good representatives of images and words, respectively, and 2) these image and word exemplars reflect their association relations with one another.

The first property concerns the information within images and text, and exploits the homogenous relation for exemplar identification. Given a valid configuration of a label vector, c, the "representativeness degree" that image $I_{ci}$ serves as the exemplar of image $I_i$ is measured by their similarity $s^I(i; c_i)$. Then, the total representativeness degree is an aggregation summed over the images:

$$E^I(c)=\Sigma_{i=1}^n s^I(i,c_i). \qquad (1)$$

Similarly, the representativeness degree for the words is defined as:

$$E^W(b)=\Sigma_{j=1}^m s^W(j,b_j). \qquad (2)$$

The second property essentially considers the affect of the heterogeneous relations between images and words for exemplar identification. This affect is formulated as a function over a pair comprising an image and a word (i, j) and their corresponding exemplars $(c_i, b_j)$: $e_{ij}(c_i, b_j)$. The whole affect function is written as follows $$R(c,b)=\Sigma_{(i,j) \in \epsilon^R} e_{ij}(c_i,b_j), \qquad (3)$$

where $e_{ij}(c_i, b_j)$ aims to set different weights according to whether $c_i$ is equal to i and whether $b_j$ is equal to j, $$e_{ij}(c_i, b_j) = \begin{cases} q(i, j), & c_i \neq i, b_j \neq j \\ \bar{q}(i, j), & c_i = i, b_j = j \\ p(i, j), & c_i = i, b_j \neq j \\ p(j, i), & c_i \neq i, b_j = j \end{cases}$$

In one implementation, for finding the heterogeneous relations, $p(i, j)=\theta_1/|\epsilon_{i.}^R|$, and $p(j, i)=\theta_2/|\epsilon_{.j}^R|$, where $\theta_1$ and $\theta_2$ are some fixed negative values; (e.g., −8 was found suitable). This is for penalizing the inconsistency of exemplar selection of those linked heterogeneous nodes. Note that q(i,j) and $\bar{q}$(i,j) may be set to zero because no penalty is to be imposed when consistent exemplars for images and words are selected.

To make c and b valid configurations, two extra constraints are introduced. The constraint for c is defined as $$V^I(c) = \sum_{k=1}^{n} \delta_k(c), \quad (4)$$

where $$\delta_k(c) = \begin{cases} -\infty, & \text{if } c_k \neq k \text{ but } \exists i : c_i = k \\ 0, & \text{otherwise} \end{cases}.$$

For b, a similar valid constraint is defined as $$V^W(c) = \sum_{k=1}^{m} \eta_k(b), \quad (5)$$

where $\eta_k(\cdot)$ is defined similarly to $\delta_k(\cdot)$. In summary, the overall objective function for visual and textual exemplar identification is written as follows, $$S(c, b) = E^I(c) + V^I(c) + E^W(b) + V^W(b) + R(c, b) \quad (6)$$

$$= \sum_{i=1}^{n} s(i, c_i) + \sum_{k=1}^{n} \delta_k(c) + \sum_{j=1}^{m} s(j, b_j) + \sum_{k=1}^{m} \eta_k(b) +$$

$$\sum_{(i,j) \in \varepsilon^R} e_{ij}(c_i, b_j).$$

Figure 3:
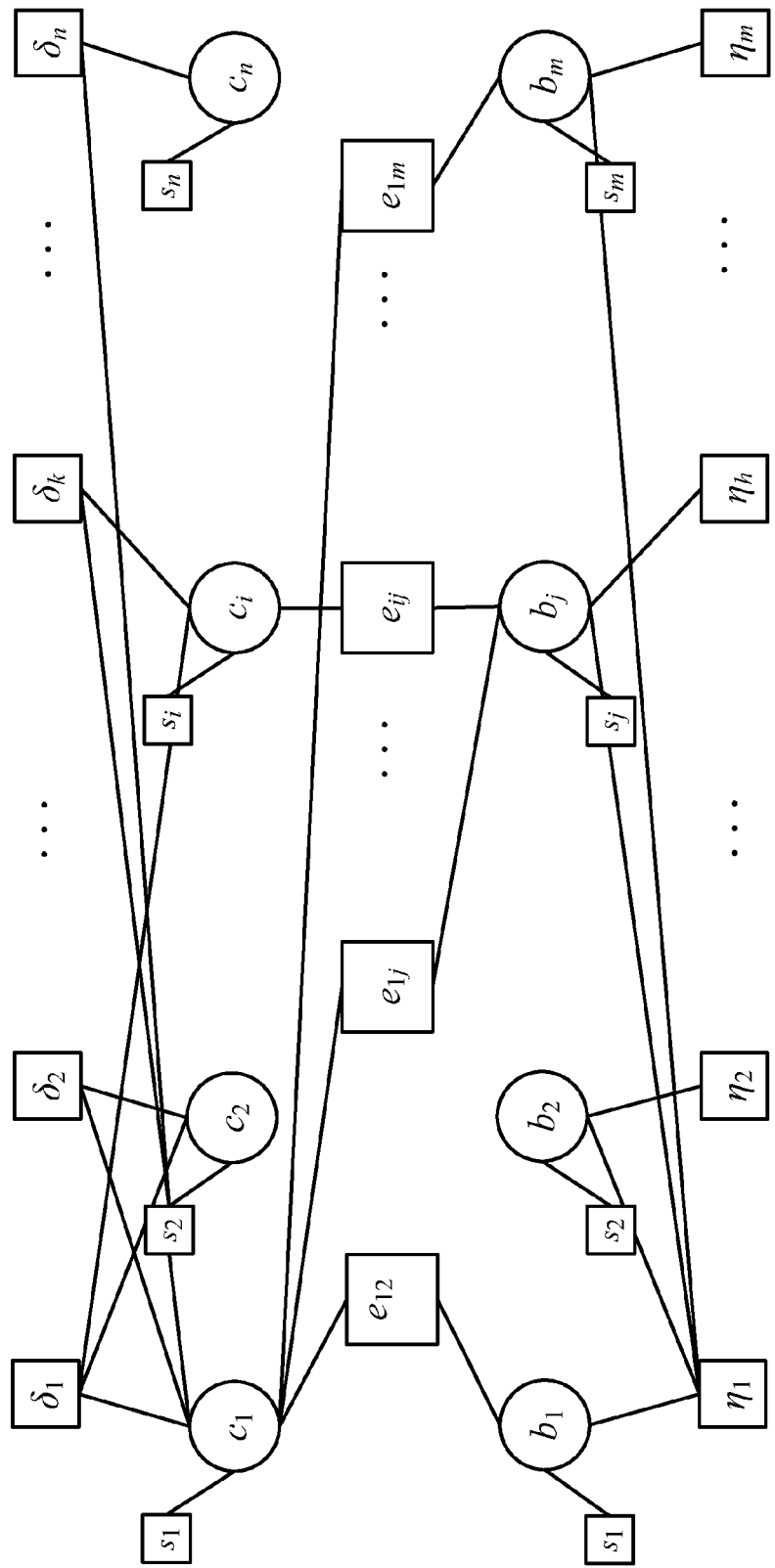
FIG. 3 is a representation comprising a factor graph for an objective function Equation (6) used to determine the visual and textual summaries.

This overall objective function of Equation (6) can be represented using a factor graph in FIG. 3. Each term in S(c; b) is represented by a function node (shown as a square) and each label $c_i$ (or $b_i$) is represented by a variable node (shown as a circle). Edges exist only between function nodes and variable nodes, and a variable node is connected to a function node if and only if its corresponding term depends on the variable. Thus, the term $s(i; c_i)$ appearing in the above expression has a corresponding function node $s_i$ that is connected to the single variable $c_i$. The term $\delta_k(c)$ has a corresponding function node $\delta k$ that is connected to the variables, $c_1, \ldots, c_n$. The term $e_{ij}(c_i, b_j)$ has a corresponding function node $e_{ij}$ that is connected to two variables $c_i$ and $b_j$. Then the global function is given by the sum of the functions represented by function nodes. From the factor graph, the formulation introduces a set of function nodes $e_{ij}$ to connect two individual factor graphs for images and words.

Turning to the scalar-valued affinity propagation algorithm, one derivation is based on the known max-sum algorithm over a factor graph, which transmits vector-valued messages between function nodes and variable nodes. The max-sum algorithm is an iterative algorithm to exchange two kinds of messages, namely one from function nodes to variable nodes, and the other from variable nodes to function nodes. For the factor graph for Equation (6) as shown in FIG. 3, the message propagation over variables $c_i$ and $b_j$ is very similar, and thus for brevity herein, the derivation is given over variable $c_i$.

Figure 4A:
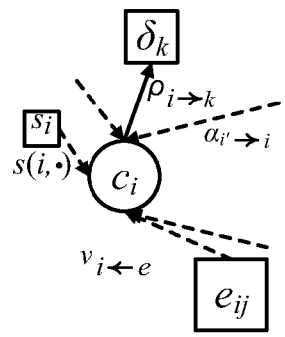
FIGS. 4A-4E are representations of vector-valued messages sent to perform message propagation.
Figure 4B:
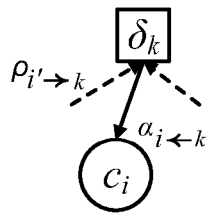

There are two messages exchanged between $c_i$ and $\delta_k$, including the message $\rho_{i \to k}$, sent from $c_i$ to $\delta_k$, comprising n real numbers, with one for each possible value of $c_i$, and the message, $\alpha_{i \leftarrow k}$, sent from $\delta_k$ to $c_i$, also comprising n real numbers. The two messages are depicted in FIGS. 4A and 4B, and are formulated as follows:

$$\rho_{i \to k}(c_i) = \sum_{e \in \varepsilon_i^R} v_{i \leftarrow e}(c_i) + s(i, c_i) + \sum_{k': k' \neq k} \alpha_{i \leftarrow k'}(c_i) \quad (7)$$

$$\alpha_{i \leftarrow k}(c_i) = \max_{h_1, \ldots, h_{i-1}, h_{i+1}, \ldots, h_n} \left[ \sum_{i': i' \neq i} \rho_{i' \to k}(h_{i'}) + \delta_k(h_1, \ldots, h_{i-1}, h_{i+1}, \ldots, h_n) \right]. \quad (8)$$

Figure 4C:
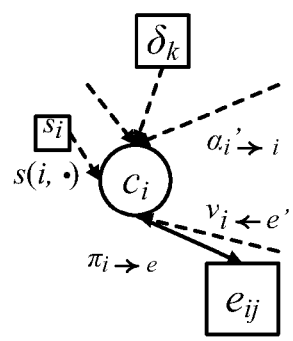
Figure 4D:
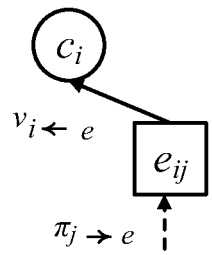
Figure 4E:
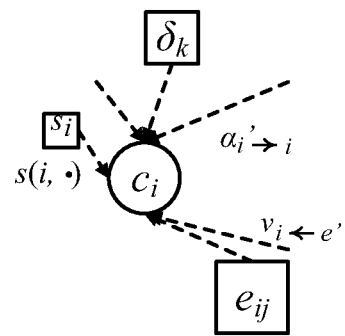

There are two messages exchanged between $c_i$ and $e_{ij}$. The message, $\pi_{i \to e}$, sent from variable $c_i$ to $e_{ij}$, comprises n real numbers, with one for each possible value of $c_i$. The message, $v_{i \leftarrow e}$, sent from variable $e_{ij}$ to $c_i$, also comprises n real numbers. The two messages are depicted in FIGS. 4C and 4D, and are formulated as follows:

$$\pi_{i \to e}(c_i) = s(i, c_i) + \sum_{k} \alpha_{i \leftarrow k}(c_i) + \sum_{e' \in \varepsilon_i^R / \{e\}} v_{i \leftarrow e'}(c_i), \quad (9)$$

$$v_{i \leftarrow e}(c_i) = \max_{b_j} [e(c_i, b_j) + \pi_{j \to e}(b_j)]. \quad (10)$$

These vector-valued messages can be reduced to a scalar-valued message, making the propagation much more efficient than vector messaging. The message is additionally propagated between heterogeneous data, images and words.

The idea behind the derivation is to analyze the propagated messages in the two cases whether $c_i$ is valued as i or not.

Derivation. Let $\tilde{\rho}_{i \to k}(c_i) = \rho_{i \to k}(c_i) - \bar{\rho}_{i \to k}$ with $\bar{\rho}_{i \to k} = \max_{h: h \neq k} \rho_{i \to k}(h)$. Let $\tilde{\alpha}_{i \leftarrow k}(c_i) = \alpha_{i \leftarrow k}(c_i) - \bar{\alpha}_{i \leftarrow k}$, with $\bar{\alpha}_{i \leftarrow k} = \alpha_{i \leftarrow k}(c_i : c_i \neq k)$. It can be derives that $\bar{\alpha}_{i \leftarrow k} = \alpha_{i \leftarrow k}(c_i : c_i \neq k)$ is independent to the specific value $c_i$. Let $$\bar{v}_{i \leftarrow e}(c_i) = v_{i \leftarrow e}(c_i) - \bar{v}_{i \leftarrow e}, \bar{v}_{i \leftarrow e} = v_{i \leftarrow e}(c_i : c_i \neq i) \quad (11)$$

$$= \max_{b_j} [e(c_i, b_j) + \pi_{j \to e}(b_j)]$$

$$= \max[\max_{b_j \neq j} [e(c_i, b_j) + \pi_{j \to e}(b_j)], e(c_i, j) + \pi_{j \to e}(j)]$$

$$= \max[\bar{q}(i, j) + \max_{b_i \neq j} \pi_{j \to e}(b_j), p(j, i) + \pi_{j \to e}(j)].$$

Let $\tilde{\pi}_{i \to e}(c_i) = \pi_{i \to e}(c_i) - \bar{\pi}_{i \to e}(c_i),$ (12)

and $$\bar{\pi}_{i \to e} = \max_{c_i \neq i} \pi_{i \to e}(c_i)$$

$$= \max_{c_i \neq i} \left[ s(i, c_i) + \tilde{\alpha}_{i \leftarrow c_i}(c_i) + \sum_{e' \in \varepsilon_i^R / \{e\}} v_{i \leftarrow e'}(c_i) + \sum_{k} \bar{\alpha}_{i \leftarrow k} \right]$$

$$= \max_{c_i \neq i} [s(i, c_i) + \tilde{\alpha}_{i \leftarrow c_i}(c_i)] +$$

$$\sum_{e' \in \varepsilon_i^R / \{e\}} v_{i \leftarrow e'}(c_i \neq i) + \sum_{k} \bar{\alpha}_{i \leftarrow k}.$$

For $\tilde{\rho}_{i \to k}(c_i = k)$ and $\tilde{\alpha}_{i \leftarrow k}(c_i = k)$ there can be obtained:

$$\tilde{p}_{i \to k}(c_i = k) = \bar{s}(i, k) - \max_{i': i' \neq k} [\bar{s}(i, i') + \alpha_{i \leftarrow k}(c_i = i')]. \quad (13)$$

$$\bar{s}(i, k) = \begin{cases} \sum_{e \in \varepsilon_i} v_{i \leftarrow e}(c_i = i) + s(i, i), & k = i \\ s(i, k), & k \neq i \end{cases} \quad (14)$$

-continued $$\tilde{\alpha}_{i\leftarrow k}(c_i = k) = \begin{cases} \sum_{i':i'\neq k} \max(0, \tilde{p}_{i'\to k}(c_i = k)), & k = i \\ \min[0, \tilde{p}_{k\to k}(c_k = k)) + \sum_{i':i'\neq i,k} \tilde{p}_{i'\to k}(c_i = k))], & k \neq i \end{cases} \quad (15)$$

For $\tilde{v}$ and $\tilde{\pi}$ the following derivations are provided:

$$\tilde{v}_{i\leftarrow e}(c_i = i) = v_{i\leftarrow e}(c_i = i) - \overline{v}_{i\leftarrow e} \quad (16)$$
$$= \max[p(i, j) + \max_{b_j \neq j} \pi_{j\to e}(b_j), q(i, j) + \pi_{j\to e}(j)] -$$
$$\max[\overline{q}(i, j) + \max_{b_j \neq j} \pi_{j\to e}(b_j), p(j, i) + \pi_{j\to e}(j)]$$
$$= \max[p(i, j), q(i, j) + \pi_{j\to e}(j) - \max_{b_j \neq j} \pi_{j\to e}(b_j)] -$$
$$\max[\overline{q}(i, j) +, p(j, i) + \pi_{j\to e}(j) - \max_{b_j \neq j} \pi_{j\to e}(b_j)]$$
$$= \max[p(i, j), q(i, j) + \tilde{\pi}_{j\to e}(j)] -$$
$$\max[\overline{q}(i, j), p(j, i) + \tilde{\pi}_{j\to e}(j)].$$

$$\tilde{\pi}_{i\to e}(c_i = i) = \pi_{i\to e}(c_i = i) - \overline{\pi}_{i\to e} \quad (17)$$
$$= s(i, i) + \tilde{\alpha}_{i\leftarrow i}(i) - \max_{c_i \neq i}[s(i, c_i) + \tilde{\alpha}_{i\leftarrow c_i}(c_i)] +$$
$$\sum_{e' \in \varepsilon_i/\{e\}} \tilde{v}_{i\leftarrow e'}(i).$$

To obtain exemplar assignment after convergence, sum together the incoming messages to $c_i$ and take the value $\hat{c}_i$ as follows:

$$\hat{c}_i = \operatorname{argmax}_{i'} \left[ \sum_{i'} \alpha_{i\leftarrow k}(i') + s(i, i') + \sum_j v_{i\leftarrow j}(i') \right] \quad (18)$$
$$= \operatorname{argmax}_{i'} \left[ \sum_{i'} \tilde{\alpha}_{i\leftarrow k}(i') + \sum_{i'} \overline{\alpha}_{i\leftarrow k} + s(i, i') + \sum_j \tilde{v}_{i\leftarrow j}(i') + \sum_j \overline{v}_{i\leftarrow j} \right].$$

It can observed that only the variables $\tilde{\rho}_{i\to k}(c_i)$ and $\tilde{\alpha}_{i\leftarrow k}(c_i)$ for $c_i = k$ and $\tilde{v}_{i\leftarrow e}(c_i)$ and $\tilde{\pi}_{i\to e}(c_i)$ for $c_i = i$ are involved in the message passing. Therefore, scalar-valued variables are defined: $r(i, k) = \tilde{\rho}_{i\to k}(c_i = k)$, $a(i, k) = \tilde{\alpha}_{i\leftarrow k}(c_i = k)$, $v(i, j) = \tilde{v}_{i\leftarrow e_{ij}}(c_i = i)$, and $w(i, j) = \tilde{\pi}_{i\to e_{ij}}(c_i = i)$. The obtained scalar-valued message propagation algorithm is described below.

Figure 5A:
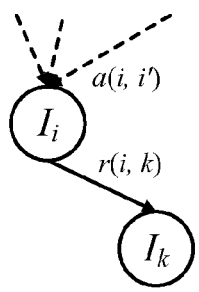
FIGS. 5A-5D are representations of scalar-valued messages sent to perform message propagation.
Figure 5B:
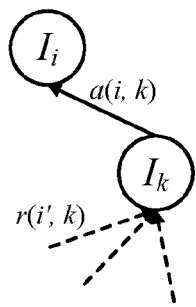
Figure 5C:
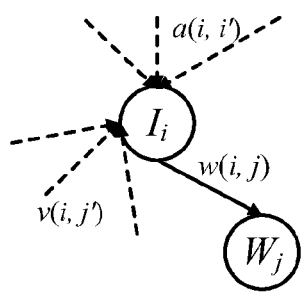
Figure 5D:
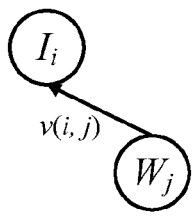

Described herein is a heterogeneous affinity propagation (HAP) algorithm, which together processes both image data and word data and identifies their exemplars. By viewing each data point as a node in a network, the process recursively transmits scalar-valued messages along edges of the network until a good set of exemplars emerges. The HAP is different from the known affinity propagation algorithm in that HAP transmits not only the messages within images and words, called homogeneous messages and depicted in FIGS. 5A and 5B, but also the messages between images and words, called heterogeneous messages and depicted in FIGS. 5C and 5D.

With respect to homogeneous message propagation, in one implementation there are two kinds of messages exchanged within image points. The "responsibility" $r(i, k)$, sent from data point i to data point k reflects how well k serves as the exemplar of i considering other potential exemplars for i. The "availability" $a(i, k)$, sent from data point k to data point i reflects how appropriately i chooses k as its exemplar considering other potential points that may choose k as their exemplar. The messages are updated in an iterative way as $$r(i, k) = \overline{s}(i, k) - \max_{i':i'\neq k}[\overline{s}(i, i') + a(i, i')]. \quad (19)$$

$$\overline{s}(i, k) = \begin{cases} \sum_{j \in \varepsilon_{i.}^R} v(i, j) + s(i, i) & k = i, \\ s(i, k) & k \neq i \end{cases} \quad (20)$$

$$a(i, k) = \begin{cases} \sum_{i':i'\neq k} \max(0, r(i', k)) & k = i, \\ \min\left[0, r(k, k) + \sum_{i':i'\neq i,k} \max(0, r(i', k))\right] & k \neq i \end{cases} \quad (21)$$

By comparison, the above two messages are similar to the original affinity propagation, but the difference lies in the responsibility $r(i, j)$, which involves the absorbability message $v(i, j)$, described below. Similar messages are defined for words.

With respect to heterogeneous message propagation, in one implementation there are two kinds of message exchanged between images and words. The "absorbability" $v(i, j)$, sent from word j to image i, reflects how well image i serves as an exemplar considering whether word j is an exemplar. The "distributability" $w(i, j)$, sent from image i to word j reflects how well word j serves as an exemplar when image i is an exemplar considering other words that are related with image i. This is like adjusting the confidence of being an exemplar via consulting the associated heterogeneous data. The two messages are updated as follows:

$$v(i, j) = \max[p(i, j), q(i, j) + w(j, i)] - \max[\overline{q}(i, j), p(j, i) + w(j, i)] \quad (22)$$

$$w(i, j) = s(i, i) + a(i, i) - \max_{i'\neq i}[\overline{s}(i, i') + a(i, i')] + \sum_{j' \in \varepsilon_{i.}^R/\{j\}} v(i, j') \quad (23)$$

A value referred to as "belief" represents the belief that image i selects image j as its exemplar, and is derived as the sum of the incoming messages, $$t(i,j) = a(i,j) + \overline{s}(i,j). \quad (24)$$

$$\hat{c}_i = \operatorname{arg\,max}_{j \in \varepsilon_{i.}^I \cup \{i\}} t(i,j) \quad (25)$$

Note that one possible implementation of heterogeneous affinity propagation takes $O(n^3 + m^3 + mn(m+n))$ per iteration. However, by reusing some computations, the algorithm can be made to only take $O(|\varepsilon^I| + |\varepsilon^W| + |\varepsilon^R|)$.

When computing the responsibility message in Equation (19) and the distributability message in Equation (23), the maximum and next-to-maximum values of $\overline{s}(i, i') + a(i, i')$ with respect to $i'$ are computed one time for each i over one pass of the whole algorithm. Then the maximum value $\max_{i':i'\neq k}[\overline{s}(i, i') + a(i, i')]$ used in Equation (19), can be found in a single operation, by checking to see if k gives the maximum (in which case the next-to-maximum value is used) or not (in which case the maximum value is used). Also, the maximum value $\max_{i':i'\neq i}[\overline{s}(i, i') + a(i, i')]$ used in Equation (23), can also be found in a single operation, by checking if i gives the maximum (in which case the next-to-maximum value is used) or not (in which case the maximum value is used).

When computing $\overline{s}(i, k)+$ and $t(i, j)$, the summation of $v(i, j)$ with respect to j is computed one time for each i over one pass of the whole algorithm. Then $\Sigma_{j' \in \varepsilon_{i.}^R/\{j\}} v(i, j')$ Equation (23) can be obtained in a single operation, subtracting it by $v(i, j)$. Similar techniques can also be used to evaluate $\Sigma_{i'} \max[0, r(i', k)]$ for computing $a(i, k)$.

By way of summary, FIG. 6 is a flow diagram showing example steps of one suitable process, beginning at step 602 where input in the form of images and associated text (e.g., a tagged image collection) is received. In general, the steps of FIG. 6 represent obtaining the data that is used in Equation (6).

Step 604 represents determining the pair-wise similarity between each of the images. Step 605 represents determining the pair-wise similarity between each of the words. Step 606 represents determining the pair-wise relationship between images and words.

Step 607 initializes the homogeneous messages and heterogeneous messages to zero. Step 608 computes homogeneous messages for images based upon image similarities and the heterogeneous messages from words to images by Equations (19 and 21). Step 609 computes homogeneous messages for words based upon word similarities and the heterogeneous messages from images to words by Equations (19 and 21).

Steps 610 and 611 compute the heterogeneous messages from images to words and the heterogeneous messages from words to images by Equations (22 and 23), respectively. Step 612 computes the exemplary images and words by Equation (25). Via step 613, steps 608-612 are performed in an iterative manner, and the iteration terminates when the exemplary images and words obtained in step 612 do not change (at least not substantially) from the previous iteration.

Step 614 outputs the obtained exemplars for the tagged image collection.

Exemplary Operating Environment

Figure 7:
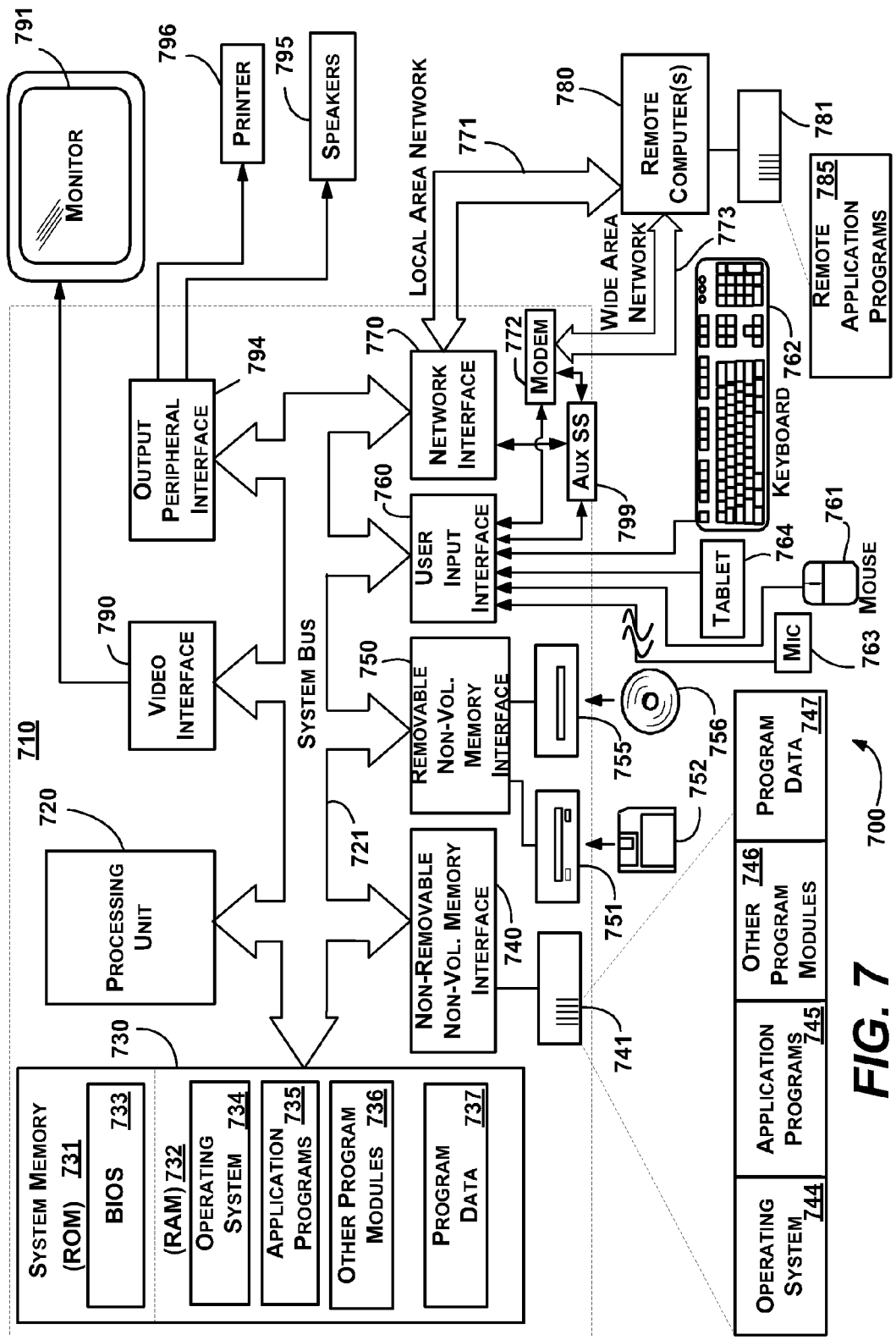
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
receiving input comprising a tagged image collection, including a plurality of images with one or more associated text labels;
identifying a first set of homogeneous relationships within the plurality of images to provide an image-to-image data structure, wherein the first set of homogeneous relationships represent pair-wise similarities between one or more images based on features of each image;
identifying a second set of homogeneous relationships within words of the one or more associated text labels to provide a word-to-word data structure, wherein the second set of homogeneous relationships represent pair-wise similarities between the words of the one or more associated text labels;
identifying a third set of heterogeneous relationships between the plurality of images and the words of the one or more associated text labels to provide an image-to-word data structure, wherein the third set of heterogeneous relationships define one or more associations between each of the plurality of images and each of the words of the one or more associated text labels; and
processing the image-to-image data structure, the word-to-word data structure, and the image-to-word data structure simultaneously to identify both visual and textual exemplars for the tagged image collection and output at least one of a visual summary of the input or a textual summary of the input using the visual and textual exemplars.

2. The method of claim 1 wherein finding the first set of relationships between images comprises selecting pairs of images, and determining a similarity for each selected pair based upon features extracted from each image.

3. The method of claim 1 wherein finding the second set of relationships between words comprises selecting pairs of words, and determining a similarity for each selected pair.

4. The method of claim 1 wherein processing the image-to-image data structure, the word-to-word data structure, and the image-to-word data structure simultaneously comprises performing heterogeneous affinity propagation to determine a set of exemplars.

5. The method of claim 4 wherein performing heterogeneous affinity propagation comprises computing homogeneous messages to be propagated within the images, computing homogeneous messages to be propagated within the words, and computing heterogeneous messages to be propagated between the images and the words.

6. The method of claim 4 wherein performing heterogeneous affinity propagation comprises computing candidate exemplars for each image and each word, including by aggregating received homogeneous messages and received heterogeneous messages.

7. The method of claim 4 wherein performing heterogeneous affinity propagation comprises iterating to update homogeneous messages using heterogeneous messages and to update heterogeneous messages using homogeneous messages, until computed candidate exemplars do not change from a previous iteration.

8. The method of claim 4 wherein performing heterogeneous affinity propagation comprises determining a heterogeneous message for each image and word pair that represents a relative measure of how well that image serves as an exemplar based on whether that word is an exemplar.

9. The method of claim 4 wherein performing heterogeneous affinity propagation comprises determining a heterogeneous message for each image and word pair that represents a relative measure of how well that word serves as an exemplar when that image is an exemplar by considering at least one other word related to that image.

10. The method of claim 1 wherein the output of the visual summary comprises at least one exemplary image.

11. The method of claim 1 wherein the output of the textual summary comprises at least one exemplary word.

12. The method of claim 1 wherein using the first set of homogenous relationships, the second set of homogenous relationships and the third set of heterogeneous relationships comprises using heterogeneous message propagation to integrate the first, second and third sets of relationships.

13. In a computing environment, a system comprising:
one or more processors;
a mechanism implemented on the one or more processors and configured to identify one or more word exemplars and one or more image exemplars for a tagged image collection, each image of the tagged image collection having one or more associated text labels, the mechanism including a heterogeneous affinity propagation component configured to propagate homogeneous messages within images based upon one or more similarities between the images, homogeneous messages within words of the one or more associated text labels based upon similarities between the words, and heterogeneous messages between the images and the words based upon the relationships between one or more of the images and the words, wherein the one or more word exemplars comprise a set of one or more words that represent at least a subset of the tagged image collection based on the homogeneous messages within the words propagated by the heterogeneous affinity propagation component, and wherein the one or more image exemplars comprise a set of one or more images that represent at least the subset of the tagged image collection or another subset of the tagged image collection based on the homogeneous messages within the images propagated by the heterogeneous affinity propagation component.

14. The system of claim 13 wherein the heterogeneous message propagation component further determines a relative measure of how well each image serves as an exemplar based on whether a paired word is an exemplar.

15. The system of claim 13 wherein the mechanism determines the similarity between a pair of images based upon feature vectors corresponding to features extracted from each image.

16. The system of claim 13 wherein the mechanism maintains information that determines whether an image has a relationship with a word, for access by the heterogeneous message propagation component.

17. The system of claim 13 further comprising:
another mechanism configured to output the one or more word exemplars as a textual summary and the one or more image exemplars as a visual summary of the tagged image collection.

18. One or more computer-readable storage devices having computer-executable instructions, which in response to execution by a computer, cause the computer to perform steps, comprising:
receiving a tagged image collection including a plurality of images and text labels, the text labels comprising one or more words associated with an image;
determining image similarity values to form one or more pair-wise similarities between each pair of images;
determining word similarity values to form one or more pair-wise similarities between each pair of words;
processing the words and images as word, image pairs to determine affinity values between each of the words and each of the images;
computing homogeneous messages within images;
computing homogeneous messages within words;
computing heterogeneous messages from images to words;
computing heterogeneous messages from words to images;
computing a candidate exemplary image from each image's perspective based upon the messages that image receives;
computing a candidate exemplary word from each word's perspective based upon the messages that word receives;
judging whether the computed candidate exemplary images and words stop changing while iterating over the computing steps; and
outputting visual and textual summaries that characterize the content of the tagged image collection.

19. The one or more computer-readable storage devices of claim 18 having further computer-executable instructions comprising:
extracting features from the plurality of images for use in determining the similarity value between each pair of images.

20. The one or more computer-readable storage devices of claim 18 wherein outputting the visual and textual summaries comprises outputting image exemplars and word exemplars.

* * * * *